United States Patent
Artebrant et al.

(10) Patent No.: US 6,982,667 B2
(45) Date of Patent: Jan. 3, 2006

(54) METHOD FOR TARGET-TRACKING OF OBJECTS

(75) Inventors: Robert Artebrant, Lund (SE); Andreas Tyrberg, Hägersten (SE)

(73) Assignee: SAAB AB, Linkoping (SE)

( * ) Notice: Subject to any disclaimer, the term of this patent is extended or adjusted under 35 U.S.C. 154(b) by 0 days.

(21) Appl. No.: 10/481,788

(22) PCT Filed: Jun. 19, 2002

(86) PCT No.: PCT/SE02/01181

§ 371 (c)(1),
(2), (4) Date: Dec. 23, 2003

(87) PCT Pub. No.: WO03/003044

PCT Pub. Date: Jan. 9, 2003

(65) Prior Publication Data
US 2004/0150551 A1    Aug. 5, 2004

(30) Foreign Application Priority Data
Jun. 28, 2001 (SE) ........................ 012328

(51) Int. Cl.
*G01S 13/72* (2006.01)
(52) U.S. Cl. .................... 342/95; 342/96; 342/195
(58) Field of Classification Search ............ 342/95, 342/96, 195

See application file for complete search history.

(56) References Cited

U.S. PATENT DOCUMENTS

| 4,845,500 A | * | 7/1989 | Cornett et al. ............. 342/90 |
| 5,289,189 A | | 2/1994 | Colegrove |
| 2004/0150551 A1 | * | 8/2004 | Artebrant et al. ........... 342/95 |

OTHER PUBLICATIONS

Chih-Chung Ke et al., Comparative Analysis of Alternative Ground Target Tracking Techniques, In: Proceeding of the Third International Conference on Information Fusion, Fusion 2000, Jul. 10/13, 2000, vol. 2, pp. 3-10.

* cited by examiner

Primary Examiner—Daniel Pihulic
(74) Attorney, Agent, or Firm—Swidler Berlin LLP

(57) ABSTRACT

A geographical region having an object to be tracked is divided into subregions, where adjacent disposed subregions partial overlap one another and the overlapping portions of adjacently disposed subregions share common states. A transition matrix is used to represent the terrain in a subregion and each subregion can have N geographical states and four (4) additional transition states. A regional tracker is used to estimate state sequences for each new observation of the object. Tracking continues until the process is complete or until the probability that the vehicle is in another new subregion occurs. Tracking performed between adjacently disposed subregions is based, at least in part by, the direction represented by the transition state. Tracking into a new subregion from an adjacently disposed old subregion begins precisely where tracking for the old subregion ended using the states that are common in the overlapping portions of the adjacently disposed subregions.

6 Claims, 2 Drawing Sheets

METHOD FOR TARGET-TRACKING OF OBJECTS

TECHNICAL AREA

This invention concerns a method for target-tracking of objects via observations from a sensor, wherein a geographical region within which at least one object is present is assigned a predetermined number of states, and the geographical region is divided into subregions. Terrain data are taken into account in the method.

STATE OF THE ART

When radar is used to perform reconnaissance of objects in the air, false echoes can be produced by rain, and by atmospheric wind shifts. These false echoes are usually so weak that no problems are encountered in differentiating them from real echoes from aircraft. The situation is somewhat different when radar is used to perform reconnaissance of objects on the ground, as structures such as vegetation and surface irregularities give rise to echoes that are as strong as those received from the objects being sought, while the false echoes are at the same time much more dispersed.

When targets are being tracked on the ground, the topography of the scenario imposes restrictions on the possible maneuvers and speeds of a vehicle. For example, a vehicle that arrives at an intersection can (after braking) continue to travel along any of the side roads. On the other hand, vehicles that are travelling along a roadway, on a bridge or in a tunnel will most probably have only one possible direction of continued travel. Furthermore, different types of vehicles are subject to different conditions in terms of their ability to advance in terrain. A tank is much more able to move about in off-road terrain than a passenger car.

The terrain does not only impose restrictions on the ability of a vehicle to advance. Different types of terrain can also conceal the vehicle from radar, so that it cannot be observed. The absence of observations may be attributable to a vehicle having been, e.g. driven into a tunnel, concealed by trees or having passed into the radar shadow cast by hills or mountains.

The terrain can also give rise to false alarms. A radar system that is registering objects must be sensitive to the surrounding terrain and movements therein in order to be able to differentiate ground targets in the terrain. Wind can cause woods and other vegetation to move enough to produce radar echoes. This can be a problem during track initiation, since areas with a high incidence of false alarms, such as wooded areas, can give rise to large numbers of echoes within a limited area, resulting in target-tracking errors.

The dynamic behavior of the ground target can also vary with respect to both vehicle type and the conformation of the terrain at the relevant time. In order to achieve a ground-target-tracking method that delivers high performance, a method is required that contains a plurality of different models that take into account vehicle types and their ability to advance in the terrain, as well as the general restrictions constituted by the topography.

DESCRIPTION OF THE INVENTION

The aforementioned problems and limitations are solved by the method according to the invention for target-tracking objects via observations from a sensor, wherein a geographical region within which at least one object is present is assigned a predetermined number of states, and the geographical region is divided into subregions so that adjacently disposed subregions all contain a share of states in common. Target-tracking is initiated in a first subregion, whereupon a first observation is associated with the object, and the probable state of the object is estimated. For each new time interval a new observation is chosen for which a new state is estimated, whereupon the estimated sequence of states in the subregion is updated. When target-tracking is begun in a new subregion, the state history from the preceding subregions is transferred to the new adjacent subregion so that the state estimate in the new subregion is based on the state history in the preceding adjacent subregions. A transition is initiated when the probability that the object has moved to a new subregion exceeds a certain predetermined value.

In a preferred embodiment of the method, a state region is created for each time interval, in which state region the new observation is likely to be found.

In yet another embodiment of the invention, the observation that has the highest probability of falling within the state region is selected as the new observation for target-tracking.

In an embodiment pertaining to a plurality of objects, separate target-tracking is initiated for each object.

In a preferred embodiment for parallel target-tracking applications, a state region for each target tracking is established for each time interval, whereupon each respective state region is the region in which a new observation for each respective target tracking is likely to be found.

In yet another preferred embodiment for parallel target-tracking applications, a choice is made as to which state region an observation belongs when there are overlapping state regions, in that the target trackings with the lowest number of observations within the state region first select a new observation.

DESCRIPTION OF EMBODIMENTS

A hidden Markov model (HMM) is defined for use in ground-target tracking. The geographical region in which the vehicle is moving is represented by a rectangular grid. Each box corresponds to a state $S_i$ in the Markov model. The time-independent transition probabilities $a_{ij}$ in the transition matrix provide a measure of both the possible geographical movement of the vehicle and of the terrain type in states $S_i$ and $S_j$. The geographical extent of the state and the time updates are chosen so that transitions are possible only to surrounding states, which means that only nine transition probabilities distinct from zero are associated with each state. In the simplest case, the terrain can consist of only two types, road and off-road.

The magnitude of the transition probability depends on the terrain type in accordance with the principle that, if the state is a road, then there is a greater probability that the next state will also be a road, i.e. if the vehicle is moving on a road, then it is more likely that it will continue on the road than that it will drive off-road.

The actual state in which the vehicle is present is not observed directly, but rather observations $O_1$ from the radar sensor serve as input parameters for the model. The Viterbi algorithm is then used to calculate the most probable sequence of states, $q^*_1, q^*_2, \ldots, q^*_t$, i.e. the estimated path of the vehicle.

The geographical region is divided into smaller regions in order to reduce the number of computations. The Viterbi algorithm used to estimate the sequence of states can be extremely computation-intensive if the geographical region is large and is thus represented by a large number of states. This division causes no problems, since the states have been chosen so that the vehicle can only move to a spatially adjacent state.

Figure 1:
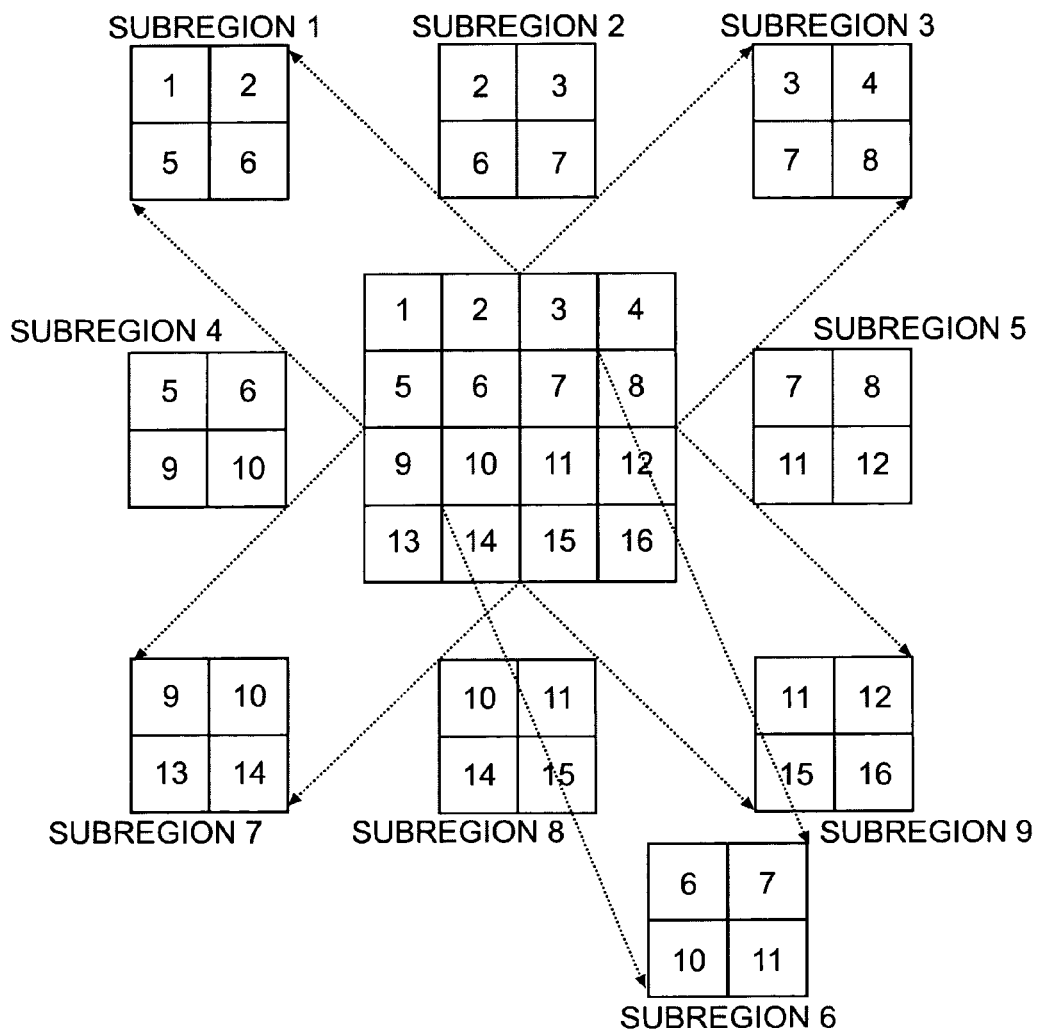
FIG. 1 Division of a geographical region into nine subregions.

The geographical region is divided in advance into L subregions $A_1, A_2, \ldots, A_L$, where each subregion contains $n_d \times m_d$ states. The subregions overlap one another by half their geographical extents, i.e. if each subregion is in turn divided into four parts, then those parts will be common to four other subregions. In this way, any state that does not lie within a distance of one-half subregion from the boundary of the total geographical region will be common to four subregions. FIG. 1 shows the appearance of a division of a geographical region into nine subregions. Each box corresponds to one-fourth of a subregion, and contains $n_d/2 \times m_d/2$ states.

For each subregion there is a transition matrix that represents the terrain in the subregion. In addition to the N geographical states, four additional states have been incorporated to represent transitions to other subregions. These four states represent transitions in a northerly, easterly, southerly and westerly direction, respectively, and are designated $S_{n+1}, S_{n+2}, S_{n+3}$ and $S_{n+4}$. The probability of transition to these states is zero for all states that are not located next to the boundary of the subregion, since the vehicle can only move to an adjacent state. In the case of states that do lie next to the boundary of the subregion, the transition probabilities are calculated in the usual way, i.e. the value of the transition probability $a_{ij}$ depends on the terrain types in state i and state j. For those transition probabilities to states that are located outside the boundary, i.e. in another subregion, the transition probabilities are combined in the state that corresponds to a transition to that subregion.

The process of tracking a ground target in a geographical region that is divided into subregions can be described as follows:

1) Initiation of target track. Tracking begins in subregion $A_1$, where the first observation $O_1$ is most centrally located. The initial probability distribution $\pi$ over the chosen subregion depends solely on the terrain in the area.
2) Updating of target track. The estimated state sequence is updated for each new observation by, e.g. a regional HMM tracker. Updating continues until the total tracking process is completed (proceed to step 5), or until $\delta_t(i)$ for any i that is greater than N is distinct from zero, i.e. until a certain probability exists that the vehicle will be in another subregion.
3) Change of subregions. Tracking continues in the adjacent subregion located in the direction represented by the transition state $S_i$ for the i that is greater than N and $\delta_t(i)$ is distinct from zero. In the event that $\delta_t(i)$ for two transition states is distinct from zero, tracking will commence in the subregion that lies in the direction represented by the two states combined, i.e. southwest, southeast, northwest or northeast.
4) Initiation of target-tracking for new subregion. As the initial probability distribution $\pi$ over the new subregion we use $\delta_{t-1}(i)$ from the previous tracking for those states that are common to both subregions, i.e. the target-tracking in the new subregion begins precisely where the target-tracking for the old subregion ended. The geographical extents of the subregions are chosen based on the precision of the radar, so that $\delta_t(i)$ geographical extent is smaller than one-half subregion; in this way we never lose any information when switching between subregions, since all states where $\delta_t(i)$ is distinct from zero will be common to both subregions. Return to step 2.
5) Conclusion. An estimated secondary state sequence for each subregion can be generated once the target-tracking from a subregion is completed. The secondary target tracks can then be joined together to produce a total target track. To prevent impermissible state transitions when switching between secondary target tracks, backtracking can be performed across the entire state sequence once the target-tracking is clearly completed. Alternatively, backtracking can be performed across two subregions at a time, so that linkage between the subregions is permissible.

When ground-tracking multiple objects in an environment with false echoes or sensor observations, a method is needed to determine when a new target track needs to be initiated. Data are gathered from a sequence of radar sweeps, and the possibility that they contain observation sequences deriving from a ground target is evaluated. If such is the case, then a new target track is initiated.

Figure 2:
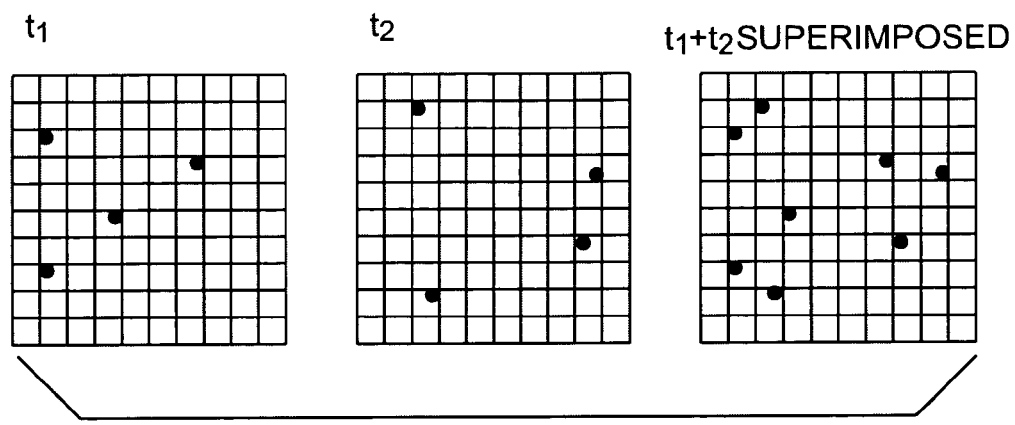
FIG. 2 Example of the creation of potential target tracks based on two radar sweeps. Radar observations are depicted as dots. Of the observations, qualified observation pairs as per the pair-forming criterion are marked in the superimposed image.
Figure 3:
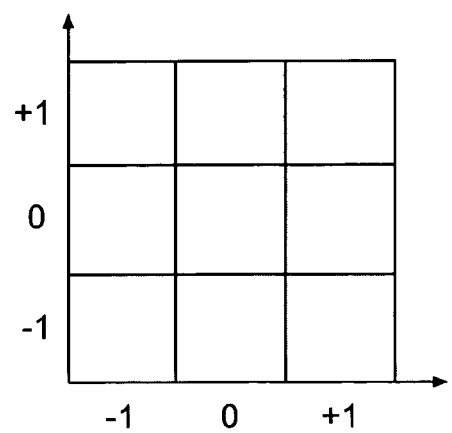
FIG. 3 Speed of ground target represented in speed state.

For two consecutive radar sweeps, potential pairs of observations from both sweeps that could derive from new ground targets are formed. The criterion for forming a pair is that the observations may not be spatially separated by more that is reasonable based on the possible state transitions of the ground targets and the properties of the radar. FIG. 2 shows an example of how potential target tracks are produced in two consecutive radar sweeps.

In order for these pairs of measurement observations to be considered as a new target track, additional observations that meet the foregoing criteria must occur in the subsequent radar sweeps. The number of observations that is needed before new target-tracking is initiated is selected based on the incidence of false alarms and the relative importance of rapidly initiating tracking of ground targets versus avoiding the initiation of false target tracks.

A number of hypothetical target tracks are created with each radar sweep. These are saved and updated until there is no observation that permits them, or until they are classified as an actual target track. If a hypothetical target track is classified as an actual target track, new tracking is initiated from the first observation in the hypothetical target track. In the new tracking process, the initial probability distribution $\pi$ is chosen based on the terrain properties of the surroundings. The state sequence $q_1, q_2, \ldots, q_t$ for the new target track is extrapolated to the current time t based on the observations in the hypothetical target track. The tracking for the new target track is updated for ensuing radar sweeps.

An excess of hypothetical target tracks results in a heavy computation load, and is memory-intensive. As a result, it is very important to be able, early on, to discard hypothetical target tracks that derive from false alarms. By having a strict pair-forming criterion, i.e., by severely limiting the maximum spatial separation permitted between two consecutive observations if they are to form a pair, the number of formed pairs will be reduced. The distance criterion for updating the track can be larger for the subsequent observations that lead to the hypothetical target track being discarded or updated. A short distance criterion may cause some of the first observations to be omitted in an observation sequence generated by a new ground target. The expected value for the distance between two observations from a ground target in motion equals the movement of the ground target between the observations, which means that the observations are usually located close to one another, since the movement of the ground target is limited to adjacent states. An actual ground vehicle will rather quickly generate observations that are sufficiently close to one another to give rise to a hypothetical target track. The distance criterion may then be chosen based on the relative importance of quickly detecting a new ground target versus limiting the number of hypothetical target tracks that are created.

Efficient target-tracking initiation thus entails that many factors be taken into account, such as the properties of the radar, the environment in which the tracking is taking place, computational and memory resources, and the requirements imposed on the tracking process.

An MTI radar registers no observations from a ground target that has stopped. Target-tracking then needs to be discontinued to avoid accumulating false echoes in subsequent radar sweeps. When a radar sweep fails to give rise to any candidates for observation, then the m subsequent sweeps are evaluated. If observations have not been registered as of n of the subsequent nm sweeps, then the target track is discontinued. The values of m and n are chosen based on the incidence of false alarms.

The possible movements of an actual ground target are physically limited, e.g. a ground target that is moving forward cannot immediately move backward. By utilizing speed information, these types of physically impossible movements can be blocked, thus enabling better estimation of the state sequence. Information concerning the speed of the ground target can only be obtained in the form of state transitions in the x- and y-directions. State transitions can only be made to adjacent states, which means that the speed can be discretized into nine different speed states, as shown in FIG. 4. Each speed state represents a state change of the position of the ground target in the x- and y-directions. The change in the speed state between two consecutive time points is limited to adjacent speed states, i.e. if the ground target has moved one state in any direction, it cannot go backwards in the same direction at the next time point. When the most probable sequence of states is calculated using the Viterbi algorithm, then we always keep track of the argument $\Psi_t(j)$, which maximizes $\delta_t(j)$ for all j and t. The argument is the state $S_i$ from which it is most likely that the ground vehicle came upon its transition to state $S_j$ at time t. When the argument has been determined, we can then also associate a speed state with the state $S_j$, based on the geographical relationship between states $S_i$ and $S_j$. At the next time when $\delta_{t+1}(j)$ is to be determined, only one transition will be permitted between the states $S_i$ and $S_j$, where the change in speed state associated with $S_i$ is permitted. This means that the argument that maximizes $\delta_{t+1}(j)$ is chosen only if the change in speed states is permitted. Otherwise the argument that yields the highest $\delta_{t+1}(j)$ will be chosen from out of those arguments that are permissible based on the speed state.

All target-tracking algorithms face a common problem with respect to how the association between observations and target tracks is to be made. An association box can be used to limit the number of observations that can be candidates for becoming a target track. If the number of candidate observations is limited, then the complexity of the computations will be reduced.

In HMM-based ground-target tracking, an association box is calculated for each time point based on the estimated probability distribution across the states at the preceding time point. Observations that fall within the association box are candidates for updating the target track. If no observations fall within the association box, then the size of the box is increased in all directions prior to the next observation. The reason why the ground target yields no observations within the association box could be that the ground target is temporarily concealed, the observation has deviated far from the true position of the ground target, or the ground target has stopped. One radar sweep that yields no observations within the association box is thus not a sufficient criterion for concluding that the ground target has stopped, and that the target track should therefore be discontinued. A plurality of consecutive radar sweeps that fail to yield observations within the association box increases the probability that the absence of observations is attributable to the fact that the ground target has stopped, and that the target track should consequently be discontinued. There is also a certain probability that a false alarm will fall within the association box. Unless the incidence of false alarms is extremely low, the criterion of requiring a number of radar sweeps in succession that fail to yield observations within the association box is overly strict. Instead, the frequency of radar sweeps from which no observations fall within the association box should be evaluated.

In the simplest type of ground-target tracking, one vehicle is observed in the absence of false radar echoes. A radar echo that, with a probability of 1, derives from the tracked vehicle is received in each time unit. The problem quickly becomes more complex when false echoes are also being received in addition to the actual observations from the vehicle. The problem lies in how the actual observation is to be selected from among all the candidates. The most problematic type of ground-target tracking involves the tracking of multiple vehicles in the presence of false echoes.

In order to be able to track a plurality of ground targets in the presence of false echoes, it is necessary to pick out a radar echo for each ground target. Each observation that is chosen must be that which is most likely to have come from the ground target in question. The selected observation that is considered to belong to the ground target in question is associated with each target track. It is important to limit the number of observations that lay claim to being the real observation from a ground target, since fewer candidates means a lighter computation load. At the same time, it is naturally very important that the correct observation be included among the candidates. The association box represents a compromise between limiting the number of candidates and the requirement that one must be able to expect that said number of candidates will contain the correct observation to a high degree of probability.

In the Viterbi algorithm a value $\delta_t(i)$ is used to indicate the highest probability, taking all earlier observations into account, for a sequence of states of length t that ends in state $S_i$. The number of states where $\delta_t(i) \neq 0$ is limited by incorporating a tolerance $\tau$ in the model. The tolerance is a measure of how large the distance between an observation and a state can be before the explanatory variable, $b_i(O_t)$, is negligible. If we define $\Delta_t$ as the vector with element $\delta_t(i)$ for those i where $\delta_t(i) \neq 0$, then at describes an approximate area that encompasses a smaller number of states in which the estimated state at the current time point is expected to be found. We thus have an estimation area for each relevant time increment for each observation from the ground target in which the next time point is expected to be found. For each tracking process that is initiated, an instance is started by the Viterbi algorithm. An estimated area is thus always available for each ground target. Association boxes are built up based on these estimated areas.

The first problem in building up association boxes concerns how they are to be designed so that it is highly probable that a correct observation from a ground target will fall within the box. The estimated area of states derived from $\Delta_t$ applies to the current time point, and this area will thus be geographically displaced relative to the next observation. Transitions to adjacent states are permitted in our HMM model, which means that a corresponding estimated area $\Delta_{t+1}$ at the next time point can only extend one state in any direction from $\Delta_t$. An area U consisting of $\Delta_t$ and all its adjacent states will thus contain the next $\Delta_{t+1}$. However, the next observation need not necessarily fall within this area.

The Viterbi algorithm starts an instance for each tracking process that is initiated, and each target track is accompanied by an association box. When the ground targets are located at such distances from one another than the association boxes do not overlap, then the only candidates for association will be the correct observation and any false echoes. If two or more association boxes do overlap and share observations in common, then both the observations from the various ground targets and the false echoes will become candidates for being the correct observations from the tracking. This means that, in this case, there will be a probability that ground targets will be "switched" during tracking.

The method used to associate a unique observation with each target track is based on finding the observation that maximizes the new $\Delta_{t+1}$ for the target track in question, i.e. the most probable observation at t+1 is linked to corresponding target tracks. This means that the most probable states with respect to all earlier observations are selected for each track. The process works as follows:

1) Tracking is initiated and association boxes are built up for all tracks with the help of $\Delta^l_t$, where the superscript refers to target track l.
2) New values of $^n\Delta^l_{t+1}$ are calculated for all tracks l and observations n that fall with the association box during target-tracking.

In order to avoid two or more target tracks being assigned a common observation, the selected observations are marked as impermissible. The selection mechanism below is carried out using sorting based on increasing numbers of observations in the association boxes. This means that a target track with a low number of observations does not get rid of the optimal observation and get assigned a substantially worse one just to give a target track with a plurality of relevant observations an observation that is marginally better than the others.

3) The sum of the elements in $^n\Delta^l_{t+1}$ for all observations n and tracks l is calculated. The observation that yields the maximum sum is associated with the relevant track and marked as impermissible for other tracks. If the maximized observation is impermissible, then the best permissible one is chosen. The $^n\Delta^l_{t+1}$ values calculated from the selected observations are designated $\Delta^l_{t+1}$.
4) The new values of $\Delta^l_{t+1}$ derived from the most probable observation for each respective tracking process are used to calculate new association boxes in the next time increment.

One major advantage of the foregoing association method is that the simple selection principle means that the method is not so computation-intensive. This can however be experienced as a limitation insofar as selection does not occur in parallel for all tracks so as to enable association that is optimized for all tracks in toto. Such parallel selection can be carried out by solving an optimization problem pertaining to the case where trackings share observations in common that are candidates for target-tracking.

The model in the described embodiment contains only two types of terrain, road and off-road. Additional terrain information must be incorporated into the model in order to track ground targets that are moving off-road. The algorithm does not need to be changed; only the transition matrix requires modification. The terrain must be graded to do this. For example, different types of terrain can be ranked based on how difficult they make it for the vehicle to advance. The terrain can be graded based on the maximum speed at which a vehicle can move, and a speed map of the scenario can thus be created. In addition to affecting the transition matrix, the terrain can also affect the observation probability, another factor that has not been implemented.

The effect of the terrain on radar observations can be incorporated into the model.

Terrain can obscure observations. Ground targets do not give rise to observations if the target is concealed. This can happen if the ground target is moving under trees, in a tunnel, under a bridge, etc. The current model contains no terrain that can conceal ground vehicles. As a result, all states are given the same observation probability if there are no observations inside the association box. As a result, the size of the association box will increase one state in all directions. If states are present in which ground targets could be concealed, and no observations are detected within the association box, then there is a greater probability that the ground target is located in some state where the ground target could be concealed. The absence of observations thus increases the observation probability for those states. Applying the same rationale, there will be a lower probability that a ground target will be located in a state that can conceal the target when observations are present within the association box. The observation probability for these states is thus reduced when observations are registered inside the association box.

The terrain causes false alarms. An MTI radar registers objects that are in motion in order to be able to differentiate ground targets in the terrain. Wind causes woods and other vegetation to move enough to give rise to radar echoes. This can be a problem in connection with track initiation, since areas with a high incidence of false alarms, such as wooded areas, can give rise to a large number of echoes within a limited area in subsequent sweeps, leading to the initiation of false target tracks. The risk that false target tracks will be initiated is reduced by having regional criteria for track initiation selected based on the incidence of false alarms, i.e. more observations are required in those areas where the likelihood of a false alarm is high. This approach also increases the probability of rapidly initiating valid target tracks in areas with a low incidence of false alarms.

The transition matrix A represents the probability of transition between states in the model. The transition probabilities $a_{ij}$ are affected by the geographical distance between states $S_i$ and $S_j$, and by the terrain in the two states.

The terrain has different effects on different types of ground targets, which means that the transition probabilities depend on the type of ground target being tracked. A tank has a much greater ability to move about in off-road terrain than does a passenger car. There is thus a need to associate different transition matrices with different types of ground targets. The choice of transition matrix is thus based on an identification of the type of ground target being tracked. Identification is made by measuring various unique properties of the ground target, which then serve as the basis for identification. We will describe some conceivable methods for doing this here:

Target-track analysis. Certain properties of the ground target can be discerned from its track, such as its speed, its ability to advance in the terrain, etc. Finding out specific properties of the target track increases the probability that the ground target is of a certain type, while at the same time making it possible to rule out other types of ground targets. The transition matrix is initially general, but as certain types of ground targets can be ruled out, the transition matrix is refined so as to better represent the ground target.

Multi-sensor combinations from sensors on a flying platform. A flying platform can be equipped with a number of different types of sensors, such as radar and cameras for recording data in the IR and visible ranges. Different ground objects give rise to different radar echo intensities; for instance, a truck produces a stronger radar echo than a passenger car. By combining camera recordings in the IR and visible ranges, type-unique properties can be detected.

Ground sensors. Ground sensors are small "pucks" that are deployed in the terrain in advance, or distributed from aircraft. Such ground sensors can be equipped with a large number of different types of sensors, such as electromagnetic (visual, infrared, radio and microwave) and acoustic sensors, motion sensors, odor sensors and magnetic sensors. The type of ground target can be identified by measuring the exhaust gas contents, noises, appearance, speed, etc. of the ground target. The ground sensors then communicate this information to the flying platform via a network.

The information collected from the individual sensors is seldom sufficient to provide an adequate decision basis for classifying the ground target. A better decision basis for such classification can be obtained by combining information from all the available sources.

What is claimed is:

1. A method for target-tracking of objects via observations from a sensor, wherein a geographical region within which at least one object is present is divided into a predetermined number of states, the method comprising:
   dividing the geographical region into partially overlapping subregions so that adjacently disposed subregions all contain a share of states in common in at least the portions of the adjacently disposed subregions that partially overlap;
   initiating target-tracking in one subregion, whereupon a first observation is associated with the object and the probable state of the object is estimated; and
   for each new time interval, a new observation is chosen for which a new state is estimated, whereupon the estimated sequence of states in the subregion is updated, and the target-tracking in a new subregion is based on the state history for the states that are shared in common with the previous subregions upon transition between two adjacent subregions, which transition is initiated when the probability that the object has moved to a new subregion exceeds a certain predetermined value.

2. The method according to claim 1, wherein for each time interval there is created a state region in which the new observation is likely to be present.

3. The method according to claim 2, wherein the observation that most probably falls within the state region is selected as the new observation for target-tracking.

4. The method according to claim 1, wherein separate target-tracking is performed out for each relevant object.

5. The method according to claim 4, wherein, for each time interval, a state region is determined for each tracking process, whereupon each respective state region is the area in which a new observation for each respective tracking process is likely to be found.

6. The method according to claim 5, wherein a choice as to the state region to which an observation belongs in the event of overlapping state regions is made in that trackings with the lowest number of observations within the state region first select a new observation.

* * * * *